United States Patent [19]

Ditschun et al.

[11] Patent Number: 4,806,735
[45] Date of Patent: Feb. 21, 1989

[54] TWIN PULSED ARC WELDING SYSTEM

[75] Inventors: Arthur Ditschun, Brampton; Boleslaw Zajaczkowski, Etobicoke, both of Canada

[73] Assignee: Welding Institute of Canada, Oakville, Canada

[21] Appl. No.: 141,243

[22] Filed: Jan. 6, 1988

[51] Int. Cl.[4] .............................................. B23K 9/09
[52] U.S. Cl. .......................... 219/130.51; 219/130.31; 219/137 PS
[58] Field of Search ...................... 219/130.51, 130.31, 219/137 PS

[56] References Cited

U.S. PATENT DOCUMENTS

| | | | |
|---|---|---|---|
| 4,396,823 | 8/1983 | Nihei et al. | 219/130.51 |
| 4,436,982 | 3/1984 | Kokura et al. | 219/130.51 |
| 4,620,082 | 10/1986 | Graville et al. | 219/130.51 |

Primary Examiner—Clifford C. Shaw
Attorney, Agent, or Firm—Rogers & Scott

[57] ABSTRACT

The invention provides a gas-shielded arc welding system using two side-by-side electrodes each of which is provided with current pulses superimposed on a respective background current level to maintain the desired controlled spray transfer mode of the weld metal without overheating effects. The pulses are supplied to the two arcs out of phase with one another to minimize interaction of their magnetic fields, but this alone is not sufficient to assure stability of the two arcs. In the system of the invention, one arc is designated as the master arc and the other as the slave arc. The master arc is stabilized by means of a feedback loop controlling its master pulse frequency. Each master pulse triggers a respective slave pulse after a preset time delay, in this way keeping corresponding master and slave pulses in synchronism. This is not necessarily sufficient to stabilize the slave arc and independent stabilization is therefore provided for it by a feedback loop controlling its pulse duration or its background current, but preferably by controlling both simultaneously.

10 Claims, 5 Drawing Sheets

TWIN PULSED ARC WELDING SYSTEM

FIELD OF THE INVENTION

The present invention is concerned with a welding system employing at least two pulsed arcs to deposit weld metal in the form of a single bead.

REVIEW OF THE PRIOR ART

The cost of fabricating by welding using consumable electrodes may be represented very approximately in terms of the material and labour that is required to deposit a given quantity of weld metal. It is therefore a constant endeavour in this industry both to provide fabrication techniques with which the amount of weld metal required is reduced, and also to provide methods and apparatus permitting increased rate of deposition of the weld metal. Another factor that must be considered is the increasing emphasis placed on the quality of the welds produced, especially with thick section welds as are now commonly required in the fabrication of high pressure vessels, pipelines, etc.

The conventional preparation of the adjacent edges of two metal sections that are to be welded together consists of machining the facing edges to provide a 60 degree included angle, and then filling the resultant V-shaped channel with the weld metal. This is satisfactory for small section thickness (say up to 30 mm), but with heavier sections, the amount of weld metal required increases disproportionately, and "narrow gap" welding processes and apparatus have been developed for joining heavy sections with essentially parallel edge preparation of the plates to be joined that are spaced only about 8-12 mm apart, this reducing the amount of weld metal required by as much as 60% to 80%. The inherently reduced weld bead cross-section involved with narrow gap processes makes it correspondingly difficult to deposit a heavy bead with a single pass while meeting the requirements for adequate penetration and avoidance of overheating, so that substantially more passes are required to fill the joint.

The desire to minimize the number of weld runs has lead to a number of developments which are summarized, for example, in an article "Developments in narrow gap welding" by I. D. Henderson, Australian Welding Journal May/June 1978, pages 4-15. One procedure is to use a heavy wire electrode with heavy current to provide enough welding energy for adequate melting and fusion of the bead to the side walls; careful control is necessary to avoid undercutting and inclusion of slag. Another procedure is to use two wire electrodes directed toward respective side walls, this permitting the use of smaller currents and producing overlapping fillet welds. Such a twin wire configurations allows a more uniform distribution of heat in the weld pool, resulting in an improved fusion profile, potentially reducing the possibility of fusion defects. It becomes very difficult to incline the heads sufficiently with deep sections and the possibility of undercutting still exists. The two wires can be straight and their respective feed heads appropriately angled, or they can be suitably twisted together or of saw-tooth shape with the heads vertical. A further group of procedures employ a single wire that again may be straight, curved or twisted, and is made to oscillate transversely in the gap as it moves longitudinally, either by oscillating the wire itself, or by oscillating the wire feed head. Twin or multi-wire systems are potentially superior to these mechanically-dependent systems because of their relative mechanical simplicity, eliminating problems of mechanical wear under the arduous conditions in which welding equipment must inherently work, and giving the possibility of a more mechanically compact system.

Twin head welding apparatus has been proposed hitherto, the two heads being disposed in tandem along the longitudinal direction of the weld (and the direction of their movement) so that they can be disposed as far apart as possible to reduce instability of the adjacent arcs due to interaction of the magnetic fields generated around the current conditions. This effect is one of many known generally as "magnetic blow" and its origins are described in an article by E. W. H. Norman in "Metal Construction" of 16 July, 1984 pages 441-445, the disclosure of which is incorporated herein by this reference. Arc blow can prevent high quality weld deposits since the metal transfer process is randomised by it, and also made less controllable. When the arcs are of different polarities the magnetic fields are added and the arcs blow outward away from each other, while if they are of the same polarity they oppose one another and the arcs blow inward. If one arc is D.C. and the other A.C. the blow is very much reduced.

An article by K. W. Brown, entitled "Switched Arc MIG Welding", published May 1978 in the Conference Proceedings "Advances in Welding Processes" of the Welding Institute, England reported the feasibility of operating twin-arcs in close proximity by alternately pulsing the arc current under fixed polarity between the two electrodes. In this arrangement, arc oscillation was achieved by use of a commutator which switched a high level current alternately between the two electrodes, while a second power source supplied a low level background current which sustained the arc between the high current pulses. Using this system, he was able to demonstrate significant modification of the bead penetration profile due to the changes in energy distribution achieved by varying the spacing between electrodes. Because of this changed energy distribution, the bead deposits have a broader central penetration which he concluded was beneficial in many applications.

In another article by M. Nakanishi et al entitled "Development of AC MIG Arc Welding", published October 1983 in the Sumitomo Search No. 28, the application of AC Welding with two electrodes in one weld pool was discussed. Two AC power sources were employed, one for each wire, and it was demonstrated that it was possible to minimize the arc blow caused by magnetic field interactions by imposing a place shift between the outputs of the two power sources. In addition, experiments are described using one solid wire and one flux-cored wire so that additional arc stabilizers can be introduced.

In gas shielded metal arc welding using consumable filler electrodes, the metal transfer occurs under the protective gas shield by one of three possible mechanisms depending upon the welding current, namely short-circuiting, globular or spray transfer. Short circuiting is the least desirable in that it is characterised by violent arc action and rapid puddle freezing. As the current increases the transfer becomes globular with the globules decreasing in size until spray transfer is obtained. The lower current required for globular transfer is advantageous in preventing overheating but since gravity provides the primary means of droplet detachment from the end of the wire electrode, the droplets fall and cannot be controlled; this prevents out-of-position welding and leads to irregular bead formation. Spray transfer is characterised by high droplet frequency and droplets of a diameter approximately equal to or less than the diameter of the electrode wire, the penetration and bead formation being more uniform and controllable.

Operation in spray mode requires the maintenance of a sufficiently high arc current density and a corresponding minimum welding current, usually called the transition current, is required. Continuous operation in spray transfer is less than ideal in some circumstances because the melting rate is too high and it is now usual to reduce the average welding current to a more desirable value, while maintaining the transition current value by supplying the current in the form of pulses whose peak value is above the transition value, but whose frequency and duration can be controlled to achieve the required average current. The power source employed usually provides two controllable current levels, namely a steady background level which is too low to produce spray mode operation, and a pulse peak level which is superimposed upon the background level, the resulting total current producing a pulsed arc that is relatively steady. The production of a uniform weld bead requires that control and maintenance of a number of interdependent factors be as constant as possible of. The most important of these factors are the arc length, the feed rate of the electrode, and with pulsed operation, the background current, the pulse peak current, the pulse width and pulse frequency, changes in one usually necessitating adjustment of one or more of the others. There is disclosed in our prior U.S. Pat. No. 4,620,082, issued 28th Oct. 1986, the disclosure of which is incorporated herein by this reference, a pulsed arc welding system in which such control is provided by sensing the arc voltage and thereby producing a signal for controlling the frequency of the welding current pulses in order to counteract variations in electrode wire feed speed or spacing of the electrode tip from the workpiece.

DEFINITION OF THE INVENTION

It is an object of the invention to provide a pulsed arc welding system employing two or more wires in which interaction between the respective arcs can be reduced.

In accordance with the present invention there is provided a pulsed arc welding system comprising; a first master welding electrode and at least one second slave welding electrode electrically insulated from one another, respective master and slave power sources for connection respectively to the first master and second slave welding electrodes for supplying respective master and slave welding currents to the said electrodes to produce respective master and slave welding arcs between them and a workpiece, said power sources each providing its respective welding current consisting of a respective master or slave continuous background current component and a respective master or slave superimposed pulse current component, means for detecting the magnitude of the arc voltage of the master welding arc, for obtaining therefrom a master pulse frequency control signal, and for feeding the said control signal to the power sources to control the frequency of the master and slave pulse current components, the control of the master pulse frequency being such as to maintain the master welding arc stable, the master and slave pulse current components thereby being maintained in synchronism with one another, means for providing a phase difference of the master and slave current components relative to one another for operation of the respective master and slave arcs with the said phase difference to reduce magnetic interference between them and means of detecting the magnitude of the arc voltage of the slave welding arc, for obtaining therefrom a slave pulse control signal, and for feeding the last-mentioned signal to the slave power source to control the duration of the slave pulse current component and/or the amplitude of the slave continuous current component so as to maintain the slave arc stable.

DESCRIPTION OF THE DRAWINGS

A gas-shielded arc welding system which is a particular preferred embodiment of the invention will now be described, by way of example, with reference to the accompanying diagrammatic drawings, wherein.

DESCRIPTION OF THE PREFERRED EMBODIMENT

Figure 1:
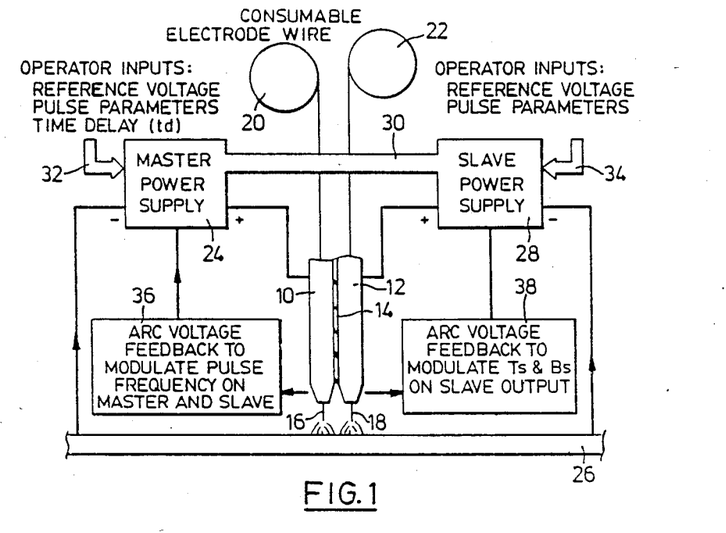
FIG. 1 is a highly schematic diagram of the system of the invention.
Figure 2:
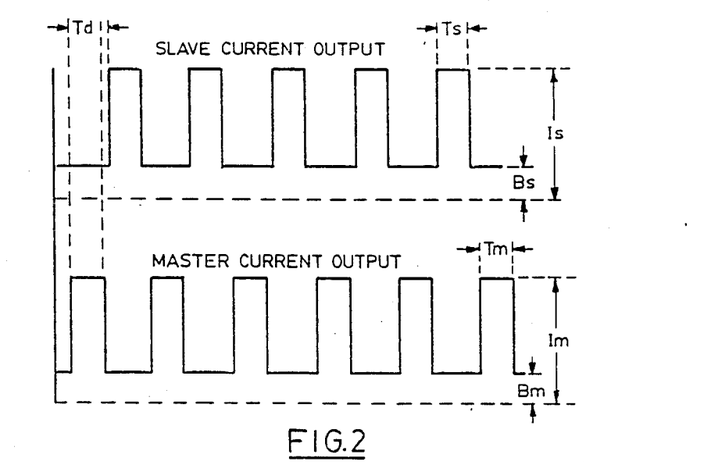
FIG. 2 shows the relationship between the master and slave current pulses that are supplied respectively to the master and slave electrodes.

Referring to FIGS. 1 and 2, a system of the invention requires two separate welding heads 10 and 12 which are placed as close together as possible, and are electrically insulated from one another by an interposed piece of insulation 14. The requirements for gas-shielding of the arcs in operation will be apparent to those skilled in the art and do not require specific description herein. The heads are supplied with respective consumable electrode wires 16 and 18 from reels 20 and 22 driven by controllable motors that are not shown. The head 10 is designated the master head and is supplied with pulses of welding current superimposed on a background current from a controlled master power supply 24, so as to produce a stable master arc between its electrode wire 16 and a workpiece 26. The head 12 is designated the slave head and is supplied with pulses of welding current superimposed on a respective background current from a controlled slave power supply 28, interconnected at 30 with the master power supply, thereby producing a stable slave arc between its electrode wire 18 and the workpiece 26. The wave forms of the master and slave pulses are shown respectively in the lower and upper parts of FIG. 2, the pulses being of peak values Im (master) and Is (slave), and of duration Tm (master) and Ts (slave). The values of the respective background currents are indicated by Bm (master) and Bs (slave) and are independent of the pulse peak values. In this embodiment the pulse durations are somewhat shorter than the respective pulse intervals and the two series of pulses are exactly 180 degrees out of place, so that each slave pulse occurs during an interval between two successive master pulses with its leading edge trailing a time delay period Td after the leading edge of the immediately preceeding master pulse. Other pulse durations, intervals and delays will be employed in other embodiments, to be determined by the operator. For example, although the pulses are illustrated herein as completely rectangular in profile, in practice the leading and trailing edges will be sloped and some overlap can therefore be tolerated between the trailing edge of one pulse (master or slave) and the leading edge of the immediately succeeding pulse (slave or master respectively) if their duration is larger than as illustrated and/or if the phase difference is not exactly 180 degrees.

The master power supply 24 is supplied by the operator via controls indicated by 32 with suitable values for a reference voltage determining the master arc length, the master pulse parameters and the time delay Td. The slave power supply 28 may be supplied by the operator via controls indicated by 34 with a reference voltage for the slave arc length and pulse parameters for occasions when the slave arc is to be operated asynchronously from the master arc, at which time the interconnection 30 is not effective.

The system comprises a master arc voltage feedback control system 36, as disclosed in our prior U.S. Pat. No. 4,620,082, connected between the master head 10 and the master power supplied 24, sensing the master arc voltage and modulating the frequency of the master arc pulses to establish the frequency, and thus the average current required to maintain the master arc stable. The signal from the system 36 is also used to modulate the frequency of the slave arc pulses so that the two sets of pulses will remain in sychronism with one another with the pre-set time delay Td between them. There is no guarantee that this frequency modulation of the slave pulses will maintain the slave arc stable, and accordingly the system is also provided with a slave arc voltage control system 38 connected between the slave head 12 and the slave power supply and modulating the slave pulse duration Ts and/or the slave background current Bs so as to maintain the average current at a value that will stabilize the arc. The two sets of pulses can therefore remain exactly out of phase with one another so as to minimize "arc blow" magnetic interference between the two arcs, while maintaining them both adequately stable. The electrodes can therefore be placed in very close proximity, as close as only 3 mm apart, more usually about 5 mm apart, so that successive weld beads can be laid successfully within a narrow parallel-walled channel between the workpieces to be joined, without requiring excessive spacing between the workpieces and without the need for mechanical movement of the wires and/or the heads, other than the translational movement required to lay the beads in their desired paths. An examination of the operation of the system by high speed photography (3,000 frames/sec) shows successive establishment of the two arcs that is an electric switching equivalent of the mechanical systems used hitherto, without the problems of design and maintenance involved with such systems. This overcomes the magnetic field interactions and produces a very stable metal transfer condition on each electrode.

The system of the invention provides the possibility of three arc gas-shielded metal arc welding with the master electrode disposed between the other two which constitute slave electrodes both controlled as described for the single slave electrode.

Figure 3:
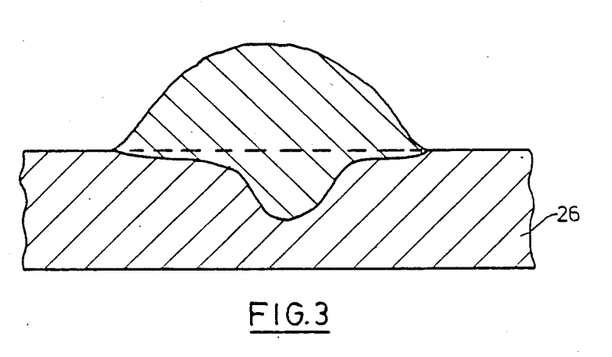
FIG. 3 is a cross-section through a prior art bead-on-plate weld produced using a single wire electrode.
Figure 4:
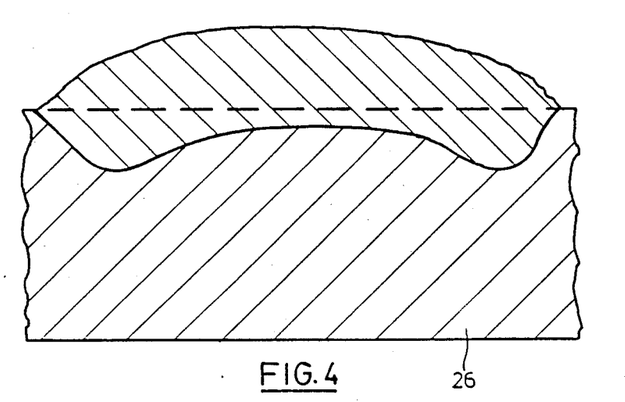
FIG. 4 is a cross-section through a bead-on-plate weld produced using the apparatus of the invention.

FIG. 3 shows the typical "finger" penetration profile obtained with a single electrode operated to obtain spray transfer. Good penetration is obtained at the centre line, but the edges do not exhibit substantial penetration into the base metal. The deep penetrating arc can also lead to "burn-through" when welding thinner materials or if the workpieces are not properly set-up FIG. 4 shows the profile obtained in a bead-on-plate weld with two electrodes of 0.9 mm steel with a transverse separation of 5 mm. The wire feed speed was 106 mm/s (250 ipm) for each electrode which corresponds to a total average current requirement of about 200A -230A. Pulse parameters were identical on each electrode (peak current =275A; background current =40A; pulse duration =4.0 ms) and the delay time was 5.0 ms. The travel speed was 3.8 mm/s or about 9 ipm.

It will be observed that the depth of penetration is much more uniform across the bead width and, although the magnitude of penetration is reduced, it exhibits lobes at the ends that are evidence of independent operation of the two welding arcs, so that it is particularly satisfactory for application to narrow gap welding to ensure good side wall fusion and penetration. It is noteworthy that deposition rates equivalent to those achieved with a single wire are obtained at twice the arc travel speed, implying the possibility of doubled productivity in commercial applications.

Because of the substantially independent but synchronous control of the two arcs, the use of two different consumable electrodes 16 and 18 is permitted. For example, it can be used in applications where a weld deposit of a particular chemistry is required, but no single commercial electrodes are available, or in applications where it is desired to custom-alloy in the weld pool from two different electrodes. The electrodes can be of two (or three) different sizes and the wire feed speeds do not need to be identical. Each electrode can have different pulse parameters, while the electrode separation is easily variable and the electrode orientation can easily be adjusted.

In an experimental system that was employed for test purposes, the two heads 10 and 12 were electrically connected together, a pulse of current being applied to both electrodes simultaneously. Since they share the current conductor there is no control over the current distribution between these two electrodes, and although on average, over a period of time, each electrode transmits half of the applied current, the instantaneous current distribution can differ substantially between the two electrodes. These inconsistencies of current distribution can cause non-uniform melting, droplet growth and irregular transfer of the metal. It was found when welding a common conductor and a single power source arrangement that a common arc column clearly emanated from the two electrodes, and this phenomena could be expected from considerations of arc-blow. With the electrodes in such close proximity, there is also the possibility of the molten droplets from each wire joining to bridge the gap. Once the gap is bridged, the current distribution may change so that one electrode conducts all of the current, and after droplet detachment the arc would only be present on one electrode. The relatively random nature of current distribution leads to non-uniform melting rates and promotes inconsistencies in droplet size and the mechanism of metal transfer.

Other advantages of the method and apparatus of the invention are that they can provide the same benefits as manual (or automatic) weaving to control bead shape or to accommodate variation in joint fit-up. The more uniform penetration profile that is obtained gives greater uniformity to the heat-affected zone profile, which has positive implications where temper-bead techniques are used in repair welding situations. Controlling penetration profile also provides a measure of control over the dilution with the parent material, which has potential benefits in weld-surfacing operations where minimum dilution is desirable. They offer potential advantages in reducing interbead lack-of-fusion in multi-pass welds as a result of being able to modify the "finger" penetration profile to a more uniform shape. A particularily advantageous application of the system is for narrow-gap applications, since it offers greater assurance of eliminating sidewall fusion defects. Thus, narrow-gap GMAW has not yet received extensive industrial acceptance because of the sidewall fusion defect incidence that has been hitherto experienced with the single wire GMAW process. Submerged-arc welding has more widespread acceptance because it is less prone to fusion defects, but it has the drawback of requiring removal of the fused flux before subsequent passes are deposited. The reliability of the narrow-gap GMAW process provided by this invention should lead to its increased adoption.

Figure 5:
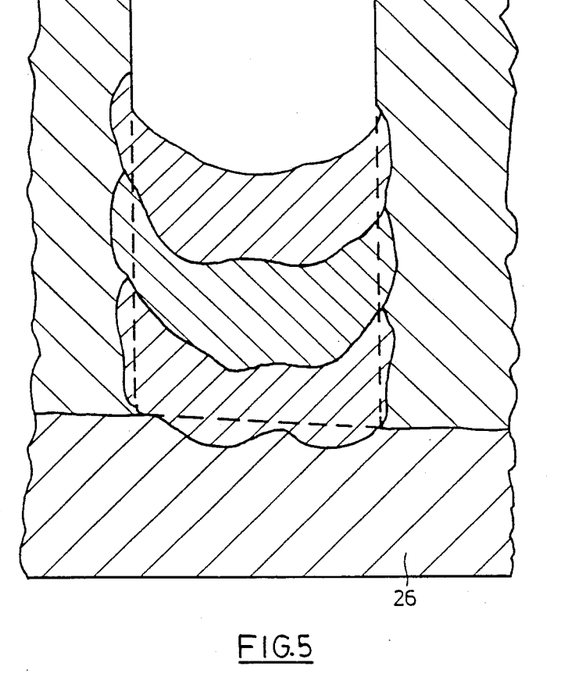
FIG. 5 is a cross-section through a partially completed narrow gap weld using the apparatus of the invention.

FIG. 5 is a cross-section through a partially completed narrow gap weld produced using the apparatus of the invention and its excellent side/penetration characteristics will be apparent to those skilled in this art. This weld was produced in a parallel-sided joint with identical parameters to that used in the head-on-plate weld of FIG. 4.

Figure 6:
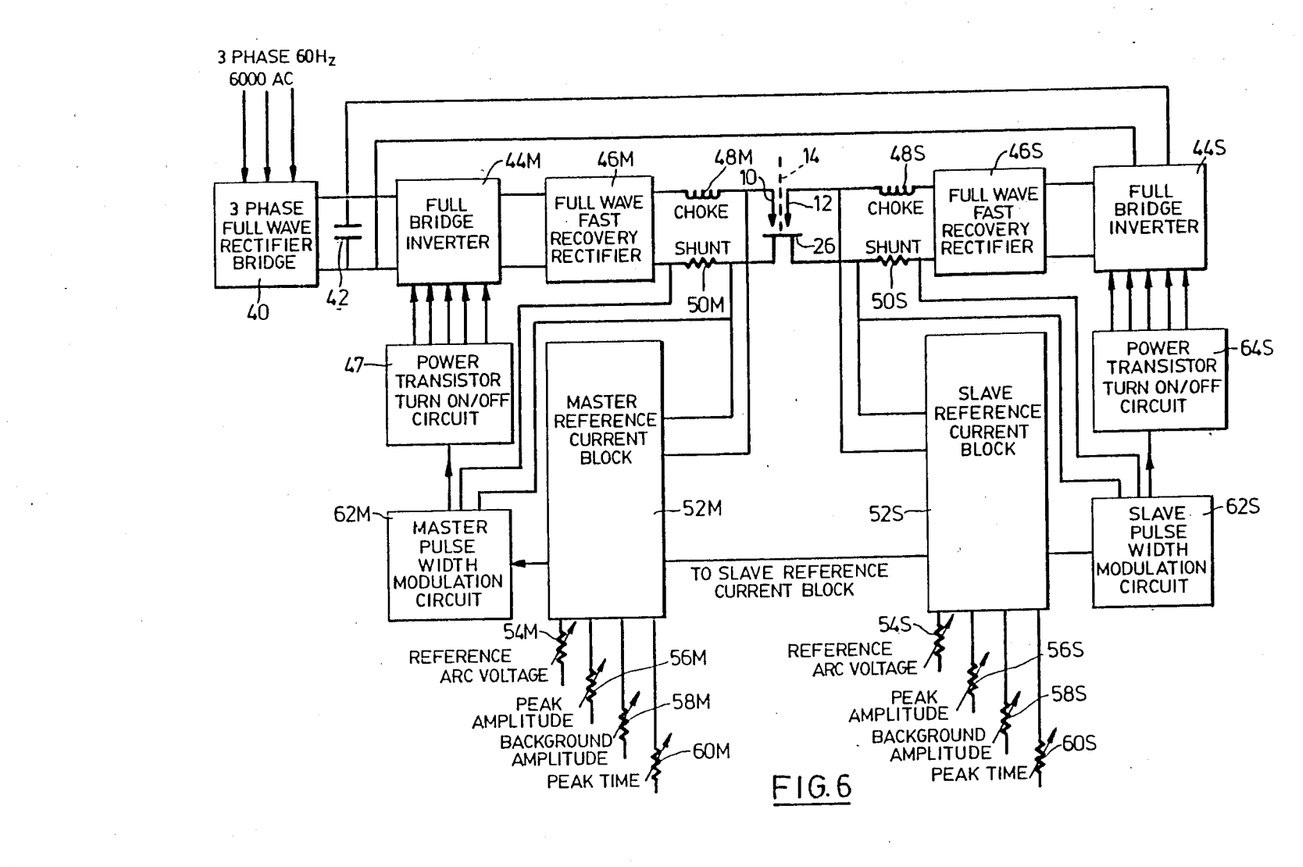
FIG. 6 is a more detailed block schematic diagram of the electrical circuit of the apparatus of the invention.

FIG. 6 shows schematically, but in more detail the electrical circuit of the apparatus of the invention; parts thereof which are similar in the master and slave circuits are given the same reference number with the respective subscript M and S. The apparatus is supplied with three phase A.C. current from a suitable power source which is fed to a full wave rectifier bridge 40, the D.C. output being smoothed by capacitor 42. The smoothed D.C. is fed to respective bridge inverter circuits 44M and 44S where it is inverted to a 16 kHz square wave and stepped down in voltage to the usual arc-operating value of 40 volts. The square wave frequency is chosen to be above the usual audible range, so that audible hum from the arc, the transformers and similar magnetic components is minimized, the frequency also being much higher than the usual pulse repetition frequency, which is varied principally in dependence upon wire speed and typically is of the order of 30-200 Hz. The higher frequency permits the use of smaller components in the circuits, particularly in the heavy current transformers that are required. This square wave is then rectified by a respective fast recovery diode full wave rectifier 46M and 46S and supplied through respective inductance 48M and 48S to the respective welding head 10 and 12.

Respective arc voltage signals are obtained between the electrodes 10 and 12 and the workpiece 26 and are fed to a respective reference current block 52M and 52S, these blocks also comprising controls, shown as variable resistors, by which the operator can set the reference arc voltages (54M nd 54S), the peak arc pulse amplitudes (56M and 56S), the amplitude of the background currents (58M and 58S) and the duration of the arc pulse peak current (60M and 60S). Each reference current block controls a respective pulse width modulation circuit 62M and 62S, that is fed with a respective current signal obtained from a respective resistive shunt 50M and 50S connected in the current path to each welding head, the pulse width modulation circuits in turn controlling a respective power transistor turn on/-off circuit 64M and 64S that controls the current supplied by the respective inverter 44M and 44S.

Thus current regulation is obtained by controlling the periods for which the transistors in the inverter circuit are turned on. The reference current signal from each also consists of a pulse superimposed on a background value, and the frequency of the pulses is controlled by comparing the arc voltage and the reference arc voltage, the resulting error signal driving a voltage controlled oscillator, the output of each oscillator triggering a respective timer that provides a pulse of pre-set duration. An increase in the reference arc voltage results in an increase in the frequency of the pulses to give a higher average current and a longer arc length, and vice versa. An increase in wire feed speed decreases the arc length and results in an increased pulse frequency with corresponding increased output current and increased wire melting, so that arc length variations are minimized. So far, both master and slave power supplies are identical and they can operate independently of one another (asynchronously) if required. The master reference current block 52M is selectively connected to the slave reference current block 52S and when so connected each slave arc pulse is triggered upon reception of a corresponding master arc pulse after the delay Td, as described above. The frequency of the master and slave pulse trains are therefore the same dependence upon the master arc voltage.

The slave arc voltage signal is fed to the current block 52S is used therein to produce an error signal that reduces the slave pulse peak duration and/or its background amplitude if it is greater than the reference slave arc voltage, thereby reducing the average slave arc current and slave arc length; similarly if the slav arc voltage is lower than the reference voltage the error signal causes the increase in the slave pulse peak time duration and/or the background current amplitude sufficient to stabilize the average arc current and arc length within desired limits.

Figure 7:
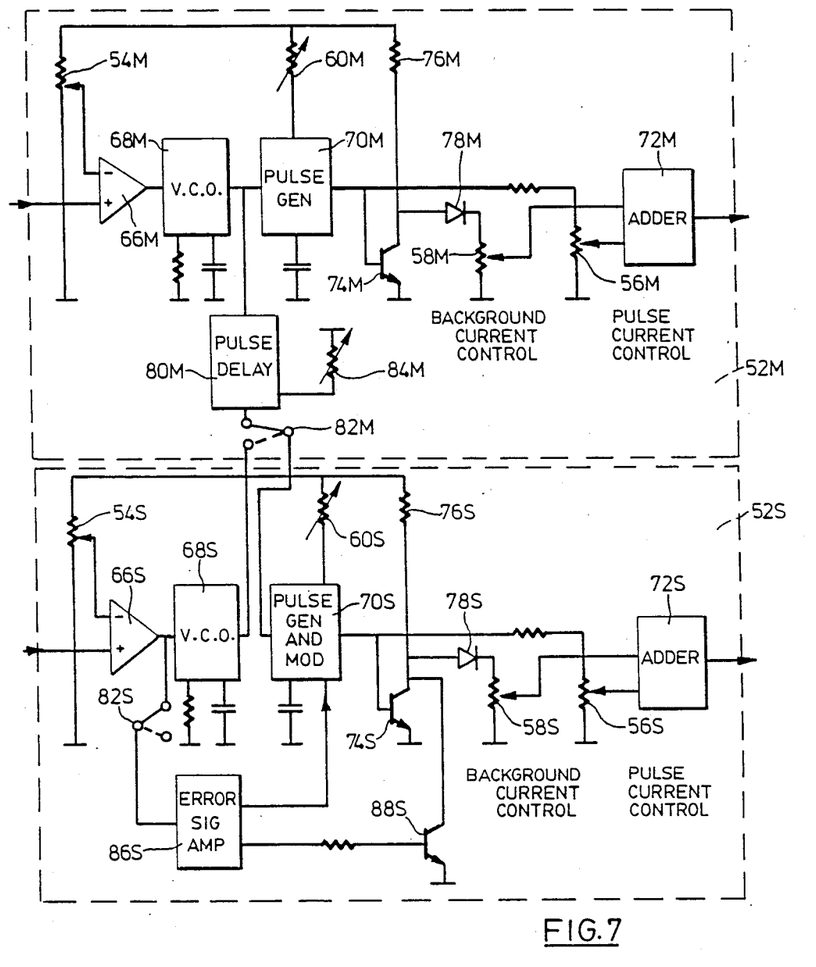
FIG. 7 is a still more detailed block schematic diagram of the electrical circuit of two of the blocks of the circuit of FIG. 6.

FIG. 7 shows in more detail the circuits of the master and slave reference current blocks 52M and 52S. In some respects, as will become more evident, the two circuits are identical, while they differ in others. The master arc voltage signal is fed to one input of an error signal differential amplifier 66M, the other input of which is supplied with the master reference arc control voltage from potentiometer 54M. The amplifier will produce an error voltage that varies about a mean value in dependence upon whether the arc voltage is larger or smaller than the predetermined value, and this error signal is supplied to a voltage controlled oscillator 68M whose output is a square wave of frequency dependent upon the input voltage. The oscillator output is fed to pulse generator 70M which generates output pulses in response to the input, the width or duration of these output pulses being pre-set by variable resistor 60M. The two generators 70M and 70S are identical and both provide for pulse width modulation by an external control signal, but this facility is not needed in the master generator. The output of generator 70M is fed via pulse current control potentiometer 56M to one output of an adder circuit 72M, from which it is fed to master pulse width modulation circuit 62M that is supplied with an arc current signal from shunt 50M to enable the circuit to control the current supplied by inverter 44M and rectifier 46M and thereby stabilise the arc. The output pulses are also fed to the base of a transistor 74M connected in series with resistor 76M, the latter being in series with background current control potentiometer 58M via diode 78M. The transistor 74M is switched on for the duration of the pulses from the generator 70M, when it short circuits the potentiometer 58M, so that no signal is supplied therefrom to the adder 72M. In the absence of a pulse, resistors 76M and 58M form a potential divider supplying a background current level control signal to the adder 72M. The pulse and background currents signals therefore separated from one another and can be adjusted independently without a change in one causing a change in the other.

The identical items of the slave current reference block have the same reference with the subscript S and operate identically, so that their operation has already been described. The output of the master oscillator 68M is fed to a pulse delay circuit 80M whose output is supplied via switch 82M to the input of pulse generator 70S; the pulse delay provided by the circuit 80M is controllable by variable resistor 84M and is used to adjust the relative phase of the master and slave pulses, as described above. The circuit 80M also includes an optocoupler to electrically isolate the two circuits. With switch 82M in this position, the output of oscillator 68S is ineffective and the two circuits operate in synchronism, while in its alternative position the two are separated and oscillator 68S and pulse generator 70S are connected, so that the circuits operate independently and asynchronously.

In synchronous mode, switch 82S is closed and the error signal that in asynchronous mode would control the oscillator 68S instead controls an error signal conditioner circuit 86S. In this embodiment, the circuit 86S produces two output signals one of which is fed to pulse generator 70S as the pulse width modulation signal described above, while the other is supplied to the base of transistor 88S to control the background current level. Thus, so long as the transistor 74S is not conducting the transistor is operative in series with resistor 76S as a potential divider able to control the background current signal fed to the adder circuit 72S.

Both slave current pulse width modulation and slave background current level control have the same effect of changing the average arc current, and are controllable independently of one another. It is therefore possible to use either of them for control of the slave arc average current, but more flexible and satisfactory control is obtained if both modes are employed simultaneously.

We claim:
1. A pulsed arc welding system comprising:
  a first master welding electrode and at least one second slave welding electrode electrically insulated from one another;
  respective master and slave power sources for connection respectively to the first master and second slave welding electrodes for supplying respective master and slave welding currents to the said electrodes to produce respective master and slave welding arcs between them and a workpiece;
  said power sources each providing its respective welding current consisting of a respective master or slave continuous background current component and a respective master or slave superimposed pulse current component;
  means for detecting the magnitude of the arc voltage of the master welding arc, for obtaining therefrom a master pulse frequency control signal, and for feeding the said control signal to the power sources to control the frequency of the master and slave pulse current components, the control of the master pulse frequency being such as to maintain the master welding arc stable, the master and slave pulse current components thereby being maintained in synchronism with one another;
  means for providing a phase difference of the master and slave current components relative to one another for operation of the respective master and slave arcs with the said phase difference to reduce magnetic interference between them; and
  means of detecting the magnitude of the arc voltage of the slave welding arc, for obtaining therefrom a slave pulse control signal, and for feeding the last-mentioned signal to the slave power source to control the duration of the slave pulse current component and/or the amplitude of the slave continuous background current component so as to maintain the slave arc stable.

2. A welding system as claimed in claim 1, and comprising:
  a single first master welding electrode and two second slave welding electrodes disposed on opposite sides of the first master welding electrodes;
  and separate power sources for each second slave welding electrode controllable to maintain the respective slave arc stable.

3. A welding system as claimed in claim 1, wherein the duration of the slave pulse current component and the amplitude of the slave continuous background current component are independent of one another, are independent of master pulse parameters, and are independently controllable for stabilization of the arc.

4. A welding system as claimed in claim 3, wherein the duration of the slave pulse current component and the amplitude of the slave continuous background current component are independently controllable for stabilization of the arc through a feedback loop.

5. A system as claimed in claim 1, and including means enabling the master and slave arcs to be operated independently of one another and asynchronously.

6. A system as claimed in claim 1, wherein the said master and slave pulse frequency control signals are employed to control respective voltage controlled oscillators feeding respective pulse generators for generation of respective pulses for control of the respective arc currents.

7. A system as claimed in claim 1, wherein the said pulses are operative with a switching frequency above the audible range to reduce audible magnetic hum.

8. A system as claimed in claim 1, in which the two electrodes are consumable and are of different dramatics.

9. A system as claimed in claim 1, in which the two electrodes are consumable and are of different compositions.

10. A system as claimed in claim 1, in which the two electrodes are consumable and are of different feed rates.

* * * * *